(12) United States Patent
Hulvey

(10) Patent No.: US 7,916,001 B2
(45) Date of Patent: *Mar. 29, 2011

(54) METHODS FOR INTERROGATING OBJECTS TO BE IDENTIFIED OVER A COMMUNICATIONS MEDIUM

(75) Inventor: Robert Hulvey, Hermosa Beach, CA (US)

(73) Assignee: Etag Systems, Inc., Laguna Nigel, CA (US)

( * ) Notice: Subject to any disclaimer, the term of this patent is extended or adjusted under 35 U.S.C. 154(b) by 431 days.

This patent is subject to a terminal disclaimer.

(21) Appl. No.: 11/702,953

(22) Filed: Feb. 5, 2007

(65) Prior Publication Data

US 2007/0222561 A1    Sep. 27, 2007

Related U.S. Application Data

(63) Continuation of application No. 11/285,450, filed on Nov. 21, 2005, now Pat. No. 7,173,518, which is a continuation of application No. 10/831,754, filed on Apr. 23, 2004, now Pat. No. 6,967,564, which is a continuation of application No. 09/811,110, filed on Mar. 16, 2001, now Pat. No. 6,727,803.

(51) Int. Cl.
*H04Q 5/22* (2006.01)
*H01H 67/00* (2006.01)
*G07C 9/00* (2006.01)

(52) U.S. Cl. .................. 340/10.31; 340/10.1; 340/10.2; 340/825.02; 340/825.56; 340/10.51; 370/437; 370/458

(58) Field of Classification Search ............... 340/10.31, 340/10.1, 10.2, 825.02, 10.51, 825.56; 370/437, 370/458, 346, 312, 445, 449; 707/100, 101; 711/128, 118

See application file for complete search history.

(56) References Cited

U.S. PATENT DOCUMENTS

| | | | |
|---|---|---|---|
| 4,476,469 A | 10/1984 | Lander | 340/825.49 |
| 4,654,658 A | 3/1987 | Walton | 340/825.54 |
| 4,703,327 A | 10/1987 | Rossetti et al. | 342/44 |
| 4,725,841 A | 2/1988 | Nysen et al. | 342/44 |
| 4,730,188 A | 3/1988 | Milheiser | 340/825 |
| 4,752,680 A | 6/1988 | Larsson | 235/492 |
| 4,783,646 A | 11/1988 | Matsuzaki | 340/372 |
| 4,797,948 A | 1/1989 | Milliorn et al. | 340/54 |
| 4,799,059 A | 1/1989 | Grindahl et al. | 340/ 870.03 |
| 4,862,160 A | 8/1989 | Ekchiau et al. | 340/825.54 |
| 4,884,208 A | 11/1989 | Marinelli et al. | 364/460 |
| 5,008,661 A | 4/1991 | Raj | 40/825.54 |
| 5,057,095 A | 10/1991 | Fabian | 604/362 |
| 5,063,380 A | 11/1991 | Wakura | 340/825.54 |
| 5,214,410 A | 5/1993 | Verster | 340/572 |
| 5,266,925 A | 11/1993 | Vercellotti et al. | 340/572 |
| 5,294,931 A | 3/1994 | Meier | 342/44 |
| 5,339,073 A | 8/1994 | Dodd et al. | 340/825.31 |
| 5,340,968 A | 8/1994 | Watanabe et al. | 235/380 |
| 5,424,858 A | 6/1995 | Gillotte | 359/143 |
| 5,446,447 A | 8/1995 | Carney et al. | 340/572 |
| 5,450,070 A | 9/1995 | Massar et al. | 340/825.35 |
| 5,489,908 A | 2/1996 | Orthmann et al. | 340/10.32 |
| 5,519,381 A | 5/1996 | Marsh et al. | 340/572 |

(Continued)

*Primary Examiner* — Brian A Zimmerman
*Assistant Examiner* — Nam V Nguyen
(74) *Attorney, Agent, or Firm* — Loudermilk & Associates

(57) ABSTRACT

Systems and methods for efficiently querying and identifying multiple items on a communication channel are disclosed. The invention is well suited to use with radio frequency identification with interrogation devices and systems that identify radio frequency identification transponders. A depth-first tree traversal protocol algorithm, including commands and symbols, is used to more efficiently interrogate a plurality of transponders in a short amount of time.

20 Claims, 7 Drawing Sheets

U.S. PATENT DOCUMENTS

| | | | |
|---|---|---|---|
| 5,537,105 A | 7/1996 | Marsh et al. | 340/825.54 |
| 5,550,547 A | 8/1996 | Chan et al. | 342/42 |
| 5,550,548 A | 8/1996 | Schuermann | 342/42 |
| 5,557,280 A | 9/1996 | Marsh et al. | 342/44 |
| 5,572,226 A | 11/1996 | Tuttle | 343/726 |
| 5,583,819 A | 12/1996 | Roesner et al. | 365/225.7 |
| 5,602,538 A | 2/1997 | Orthmann et al. | 340/825.54 |
| 5,630,064 A | 5/1997 | Ishibashi et al. | 395/200.05 |
| 5,635,917 A | 6/1997 | Todman | 340/825.37 |
| 5,648,765 A | 7/1997 | Cresap et al. | 340/825.35 |
| 5,666,417 A | 9/1997 | Liang et al. | 380/23 |
| 5,684,976 A | 11/1997 | Soheil-Arasi et al. | 711/128 |
| 5,689,238 A | 11/1997 | Cannon, Jr. et al. | 340/568 |
| 5,751,221 A | 5/1998 | Stanfield et al. | 340/825.35 |
| 5,774,876 A | 6/1998 | Woolley et al. | 705/28 |
| 5,779,839 A | 7/1998 | Tuttle et al. | 156/213 |
| 5,841,770 A | 11/1998 | Snodgrass et al. | 370/346 |
| 5,856,788 A | 1/1999 | Walter et al. | 340/825.54 |
| 5,936,527 A | 8/1999 | Isaacman et al. | 340/572.1 |
| 5,986,570 A | 11/1999 | Black et al. | 340/825.54 |
| 6,002,344 A | 12/1999 | Bandy et al. | 340/825.54 |
| 6,072,801 A | 6/2000 | Wood | 370/437 |
| 6,127,928 A | 10/2000 | Issacman et al. | 340/572.1 |
| 6,177,858 B1 | 1/2001 | Raimbault et al. | 340/10.1 |
| 6,226,300 B1 | 5/2001 | Hush et al. | 370/437 |
| 6,307,848 B1 | 10/2001 | Wood, Jr. | 370/329 |
| 6,321,230 B1 | 11/2001 | Joslin et al. | 707/100 |
| 6,469,618 B1 | 10/2002 | Gaultier | 340/10.3 |
| 6,724,297 B1 | 4/2004 | Vacherand et al. | 340/10.3 |

METHODS FOR INTERROGATING OBJECTS TO BE IDENTIFIED OVER A COMMUNICATIONS MEDIUM

This is a continuation of U.S. application Ser. No. 11/285,450, filed Nov. 21, 2005, now U.S. Pat. No. 7,173,518, which is a continuation of U.S. application Ser. No. 10/831,754, filed Apr. 23, 2004, now U.S. Pat. No. 6,967,564, which is a continuation of U.S. application Ser. No. 09/811,110, filed Mar. 16, 2001, now U.S. Pat. No. 6,727,803.

FIELD OF THE INVENTION

The present invention relates to devices and systems for radio frequency identification, and more particularly to interrogation devices and systems that identify radio frequency identification transponders.

BACKGROUND OF THE INVENTION

Radio Frequency Identification (RFID) is a technology that is used to locate, identify and track many different types of items, such as clothing, laundry, luggage, furniture, computers, parcels, vehicles, warehouse inventory, components on assembly lines, and documents. RFID transponders are used in much the same way as optical bar codes, identifying the item to which they are affixed as being a particular individual or as being part of a specific group. Unlike bar codes, RFID transponders, such as items 6 in FIG. 1, can be read even when they cannot be seen, and hence a "direct line of sight" for transmitted RF energy 4 and reflected RF energy 8 (FIG. 1) is not required between an interrogation device 2 and a transponder. Furthermore, the identification numbers of a multiplicity of transponders 6 can be read virtually simultaneously, with little or no effort on the part of the user to "aim" the interrogation device at each and every transponder. Some RFD transponders can store information in addition to that used for identification. This additional information may also be re-programmable by the user. Information within the transponder is typically accessed by a process variously referred to in the art as "scanning," "reading," or "interrogating."

RFID transponders are typically interrogated by a radio transceiver with some added intelligence to enable it to send and receive data in accordance with a communication protocol designed into the transponder. When interrogating one or more transponders, the transceiver transmits RF energy 4 to the transponder, and encodes information on the outgoing signal by modulating the amplitude, phase and/or frequency of the signal. The RFID transponder can receive this signal and interpret the information sent by the interrogating device, and may also then respond by sending information contained in reflected RF energy 8 back to the interrogating device.

RFID transponders are often classified as either active or passive. An active transponder is continuously powered by a battery or alternate power source. In contrast, a passive transponder obtains its power from the RF field imposed upon it by an RFID transponder interrogation device. A passive RFID transponder, therefore, must remain close enough physically to the interrogating device to obtain adequate power to operate its circuits. Typically, the range for a passive transponder will be less than that of an active transponder, given that the interrogating device is transmitting the same amount of RF power at the same frequency for both types of transponders.

RFID transponders may be constructed from discrete components on a circuit board or they may be fabricated on a single silicon die, using integrated circuit (IC) techniques and needing only the addition of an antenna to function. Transponders are generally designed to operate in one of a number of different frequency bands. Popular frequency bands are centered around 125 kHz, 13.56 MHz, 915 MHz and 2.45 GHz. These particular frequencies are chosen primarily because regulations in many countries permit unlicensed operation in these bands, and the permitted transmission power levels are suitable for communicating with and/or providing power to the RFID transponders. Transponders operating at lower frequencies (e.g., 125 MHz and 13.56 MHz) generally require larger antennas, and typically employ inductive coupling via multiple-turn coils to achieve a small antenna size. Still other low-frequency transponders leverage capacitive coupling via large conductive surfaces. High frequency transponders typically utilize electric field coupling via simple half wavelength dipole antennas. For example, 2.45 GHz transponders can use simple paper-thin, printed-conductor antennas as small as 60 mm by 5 mm. In contrast, 125 kHz transponders typically use a coil antenna, usually either made of many loops of wire or of a foil spiral affixed to a substrate material. In low frequency transponders, coils, printed spirals, or conductive areas must be quite large in order to achieve an appreciable operating range. Examples of such transponders may be found in U.S. Pat. Nos. 4,654,658 and 4,730,188.

RFID transponders are typically identified by a number contained within a memory structure within each transponder. This memory structure may be programmed in a variety of ways, depending on the technology used to implement the memory structure. Some transponders may employ factory-programmable metal links to encode the ID. Others may employ one-time-programmable (OTP) methods, which allow the end user to program the ID. This is often referred to as Write Once, Read Many (WORM) technology, or as Programmable Read Only Memory (PROM). Both fusible links and anti-fuse technologies are used to implement this method of storage. Still other technologies allow the user to program and re-program the ID many times. Electrically Erasable Programmable Read Only Memory (EEPROM) and FLASH memory are examples of technologies that can be used to implement this type of access. The transponder ID number is typically stored in a binary format for ease of implementation, though other representations could be used.

When multiple RFID transponders are within range of the interrogating device, it is typically desired to be able to identify all of the transponders in the field. Once the transponders have been identified, their presence may be noted in a computer database. Following identification, each of the transponders may also be addressed individually to perform additional functions, such as the storing or retrieving of auxiliary data.

The ability of the system to efficiently identify the presence of a multiplicity of transponders is highly dependent upon the communications protocol used to interrogate the transponders. Among those familiar with the art, a protocol suitable for allowing multiple transponders to respond to an interrogation request is typically referred to as an "anti-collision protocol." The process of singling out one transponder for communication is typically referred to as the process of "isolation."

Most anti-collision protocols communicating between an interrogation device and a multiplicity of RFID transponders simultaneously present in an RF field have relied upon pseudo-random number (PN) generators. PN generators are typically used to vary the time during which the transponders may respond, so as to eventually allow a response from each transponder to reach the interrogation device without colliding destructively with the response from another transponder.

Examples of such protocols can be found in U.S. Pat. Nos. 5,537,105, 5,550,547, and 5,986,570.

A drawback of using PN generators is that it is difficult to predict the time required to identify all of the transponders in the field, given that a certain number of transponders are in the field; hence, the time required is non-deterministic, even when the identities of the transponders being read are known. The use of random or pseudo-random intervals also necessitates the use of large time gaps between transponder transmissions to decrease the likelihood of collision between the transponder transmissions. This slows down the transponder communication process and drastically decreases the number of transponders which can be identified during a given amount of time. Previous anti-collision protocols utilizing PN generators have claimed to have the ability to achieve sustained read rates of up to approximately 80 transponders per second. Some protocols can read a single transponder in as little as 1 ms, but as the number of transponders in the field multiplies, PN generator-based protocols decline in performance, significantly increasing the average per-tag read time required.

The only known non-PN generator-based protocols available are described in U.S. Pat. Nos. 6,002,344, 5,856,788 and 5,339,073. The method of the first patent uses a simplistic "roll call" method of identifying tags in the field. The methods described in the latter two of these patents interrogate the identification in a bit-by-bit fashion. These methods allow many transponders to reply to an interrogation simultaneously, but in a way that the interrogation device can still determine whether or not at least one transponder responded.

The protocol described in U.S. Pat. No. 6,002,344 uses a very simple approach in that it merely queries the presence of a tag containing each possible identification number in sequence. Though the method does provide for some rudimentary collision resolution by means of providing additional identification numbers on which to repeat the search, it is very unsophisticated in its approach. The method is essentially an "exhaustive" search, and the search time grows exponentially with the number of bits in each identification number.

The protocol described in U.S. Pat. No. 5,856,788 is similar to a protocol used to uniquely identify and automatically configure expansion cards presently common in personal computers (PCs) employing the Industry Standard Architecture (ISA) expansion bus (as described in the "Plug and Play (PNP) ISA Specification" by Intel and Microsoft). The protocol described in U.S. Pat. No. 5,856,788 and the ISA PNP protocol are designed to interrogate a unique identification number in a bit-by-bit fashion. The interrogated device, which may be a transponder or a PC expansion card, responds to a request for a specific bit by returning a symbol for a logic one, if the respective bit is of a specific predetermined value (usually one). If the respective bit in the device is not of the specific predetermined value, no response is returned. Responses are designed such that many devices may respond simultaneously without interfering with one another. If a response is received, the interrogating device may then conclude that at least one device exists containing the predetermined value in the requested bit location. After receiving a response, the interrogation device will then command all transponders that did not respond to enter an idle state. If no response is received, the interrogation device must assume that a transponder with a zero in the bit position just interrogated may be present, and the next bit is then interrogated. This process is repeated for the remaining bits until a single transponder remains in a non-idle state. This transponder is then said to be isolated.

When no response is received by the interrogation device for any given bit being interrogated, the interrogation device cannot determine whether the lack of a response was due to the presence of a tag with a zero in the bit position just interrogated or to the complete absence of tags which are able to respond.

Hence, both the protocol described in U.S. Pat. No. 5,856, 788 and that used by ISA PNP terminate once the reception of an ID number which consists of all zero-valued bits is detected. Any time an identification process is commenced, this "phantom" transponder ID number must always be read in order to terminate the identification process. Furthermore, should a transponder suddenly be removed from the communication medium during an interrogation, the interrogating device would then misinterpret the lack of responses during the remainder of the interrogation as being indicative of a value of zero for the remaining bits. Further verification must be performed to assure that the ID received is correct. This is obviously undesirable, and adds unnecessary overhead to the protocol. This method also does not lend itself well to applications utilizing ID numbers stored in non-binary formats.

The method described in U.S. Pat. No. 5,339,073 is similar to that described in U.S. Pat. No. 5,856,788, but provides a time slot for each possible value in each field being interrogated. Each field can be considered to contain a single digit of the ID number of the transponder. For binary-valued fields, two time slots are provided. The provision of a response for all possible field values accommodates non-binary ID storage, and eliminates the necessity of reading an all-zero ID number as in the method of U.S. Pat. No. 5,856,788. This method requires that the sequence of field values, which led up to an interrogation resulting in transponders responding, be recorded and later retransmitted in order to select specific groups of transponders for further interrogation. This process is repeated until the ID number of each transponder has been completely determined. The retransmission process adds unnecessary overhead to the identification protocol.

A system for locating documents or other objects is disclosed in U.S. Pat. No. 5,936,527. The invention disclosed herein was designed for, and hence is well suited for application in such a system, as it provides for the rapid interrogation of large numbers of transponders in a short period of time.

A typical RFID interrogation transceiver is shown in FIG. 2 herein, wherein interrogating transceiver 2 sends a predetermined series of transmissions and a typical RFID transponder 6 (in FIG. 3) receives the transmission at antenna 28, which is coupled to receive circuit 32. The reception as illustrated in FIG. 3, also generates power at item 30, for activating receive circuit 32, control circuit 36, ID memory 38, and transmit circuit 34. ID memory 38 keeps track of the transmissions received and control circuit 36 urges transmit circuit 34 to respond to a transmission when required.

As seen in FIG. 2, antenna 10 receives transponder reply transmission 8, which is coupled to band pass filter 14 in interrogation transceiver 2. The filtered received signal is demodulated and detected by control microprocessor 20. The microprocessor controls phase locked loop 22, which provides a carrier signal to frequency conversion mixers 16 and 24, representing a receive converter and a transmit modulator respectively. The control microprocessor provides the next transmission data to modulator 24 that is amplified at power amplifier 26 and connected to circulator 12 to begin the interrogation response cycle anew.

What distinguishes the present invention from the prior art is the protocol, specifically the manner in which the interrogating transceiver transmits interrogating signals to the transponder and the manner in which the transponder transmits reply signals back to the interrogating transceiver. The language of the protocol is illustrated in FIGS. 4 and 5, while the protocol for the interrogating transceiver and the transponder is illustrated in flowchart form in FIGS. 6 and 7, respectively.

SUMMARY OF THE INVENTION

In accordance with the present invention, devices, methods and systems are provided for an interrogation transceiver or interrogating system that identifies RFID transponders faster than conventional methods, thus allowing for increased scanning speed.

In a preferred embodiment of the present invention, the protocol described herein will be used in conjunction with a passive RFID transponder made to operate in the 915 MHz and/or 2.45 GHz bands. This type of high frequency transponder typically consists of a small silicon die with receiving and transmitting circuitry, and a printed antenna bonded to the die, both of which are sandwiched between small pieces of plastic film, which protect the die and antenna. The interrogating system communicates with the RFID transponder by modulating the amplitude of the transmitted RF signal at specific time intervals. In a preferred embodiment, the modulation is effected by sharply attenuating the transmitted RF signal. The transponder communicates with the interrogating system by shorting its antenna at certain intervals in response to the RF attenuation. By shorting its antenna, the transponder causes a reflection, which in turn produces a disturbance in the field being radiated by the interrogating system. This is referred to in the art as "backscatter" modulation.

The present invention provides a method for reading RFID transponders, which is not only faster than current conventional methods but is deterministic given a set of transponders to be read. These features allow one to determine exactly how much time is required to read a given number of transponders with known identities; they also allow one to arrive at mathematical expressions for upper and lower bounds for the time required to read a given number of transponders whose identities are unknown. Since random number generators are not used, the only random elements of the transponder-reading process are introduced by the fact that the transponder identities are not typically known a priori, and by the random nature of the RF communications channel, which is subject to range limitations and interference.

One of ordinary skill in the art should recognize that the protocol could also be applied over a wired communications channel, such as a computer bus or a computer network, to query the identities of objects connected to the communication channel medium. Error rates on wired channels are often low enough to be ignored, leaving only the unknown object identities to impose a random nature on the time required for the protocol to identify all objects on the channel.

In the field of RFID, it is often important to be able to read the ID numbers of a multiplicity of transponders as quickly as possible. In particular, for applications in which many transponders pass in front of a stationary reader, or in which the reader must pass over many stationary transponders, the speed with which transponders can be read and identified is a critical performance parameter. Clearly, the more items that can be processed per unit time, the more useful the system becomes. Applications such as document tracking, asset tracking, and luggage and parcel sorting may all benefit greatly from an increase in scanning speed. Thus, this invention further enhances the value of distributed interrogation systems, as the type described in the aforementioned U.S. Pat. No. 5,936,527.

The present invention uses an adaptation of a tree traversal algorithm to identify all transponders in the RF field. In the nomenclature of those skilled in the art of computer science, the algorithm can be referred to as a "depth-first" tree traversal. This type of algorithm contrasts a "breadth-first" tree traversal. The present invention offers an improvement over the method of U.S. Pat. No. 5,856,788, in that it provides a response for all objects being identified, regardless of the value of the bit being interrogated; it provides a novel improvement over the method of U.S. Pat. No. 5,339,073, which uses a breadth-first approach, in that it eliminates the need to retransmit most of the sequences of field values in the course of the interrogation process.

The method herein described provides an enormous advantage over the method of U.S. Pat. No. 6,002,344 in that the time the present invention takes to complete scales by N log N, where N is the number of bits in the identification number, rather than exponentially as in the previous method. Furthermore, the method to be described does not need to waste time querying for tag identification numbers that do not exist. For most practical applications, the method of U.S. Pat. No. 6,002,344 will exhaust most of its time performing fruitless interrogations.

Further, the present invention represents an improvement over the prior art inasmuch as all transponders in a field are interrogated and identified by a transceiver following one initial activation of the process and the apparatus, and there are no repetitive ID data transmissions in the system while transponders are in the READ mode.

It should be apparent to one skilled in the art that the invention herein described is applicable to other applications and fields in which an unknown number of items may be present on a communication channel, and for which a need exists to uniquely query and identify each of the items present. The invention may be implemented on a communications channel which may be wired, or which uses wireless communication in the form of radio frequency, optical, or acoustic signals.

Accordingly, one object of the present invention is to provide a system or method for reading RFID transponders or other suitable objects that is faster than previous methods.

Another object is to provide a system or method for reading RFID transponders or other suitable objects that is deterministic given a set of transponders to be read.

A further object of the present invention is to perform the rapid interrogation of large numbers of transponders or other suitable objects in a short period of time.

Yet another object is to substantially increase scanning speed.

Still another object is to allow many transponders or other suitable objects to reply to an interrogation simultaneously and provide a response for all objects being identified, regardless of the value of the bit being interrogated.

Another object of the present invention is to eliminate the need to retransmit most of the sequences of field values in the course of the interrogation process.

BRIEF DESCRIPTION OF THE DRAWINGS

The above objects and other advantages of the present invention will be made more apparent by describing in detail the preferred embodiments of the present invention with reference to the attached drawings in which.

DETAILED DESCRIPTION OF THE PREFERRED EMBODIMENTS

The present invention will be described in greater detail with reference to certain preferred and certain other embodiments, which may serve to further the understanding of preferred embodiments of the present invention. As described elsewhere herein, various refinements and substitutions of the various elements of the various embodiments are possible based on the principles and teachings herein.

For simplicity, it is assumed in the preferred embodiments that the fields of the IDs being interrogated are binary valued.

The preferred embodiment provides for the transponder to be in one of two modes, a MATCH mode and a READ mode. The MATCH mode is the default mode, wherein the transponder will only send data back to the interrogating transceiver if the transponder detects that the interrogating transceiver has sent out an ID number which matches the ID number in the transponder. In the READ mode, the transponder will serially shift out the bits of its ID number in response to commands from the interrogating transceiver. The transponder can be placed in this mode through the use of a special command called the "CHANGE1" command.

In the description of the protocol algorithm, the ID number is stored in a binary format and the first bit read from the transponders will always be the most significant bit (MSB) of the ID number. The protocol uniquely identifies the transponders in descending order according to their binary ID numbers. Once a transponder has been uniquely identified, it will return to an idle mode awaiting a RESET command before it can be read again.

Figure 4:
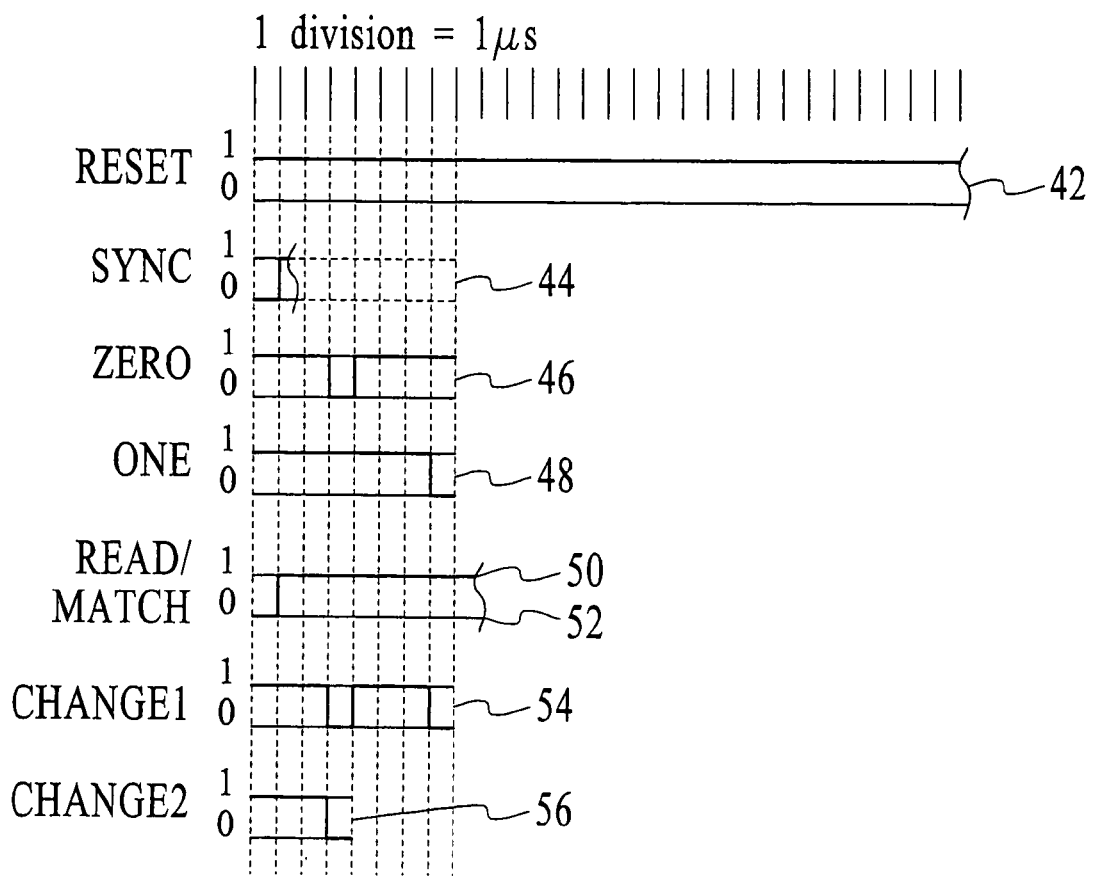
FIG. 4 shows the symbolic alphabet used by an interrogation transceiver in the preferred embodiment to communicate with the transponder.

FIG. 4 shows a graphical representation of a preferred embodiment of the command and data symbols used to transmit data from the interrogating transceiver to the RFID transponders. Data is encoded using a form of pulse position modulation (PPM).

To communicate with the transponder, the following command and data symbols shown in FIG. 4 are implemented:

The transponders will perform a RESET operation after they sense a specific duration of constant RF illumination 42 from the interrogating transceiver. This duration must be longer than the maximum duration of continuous RF illumination encountered during the execution of the remainder of the protocol. In the preferred embodiment, this duration is 28 microseconds (μs).

The first pulse received following the RESET period is considered to be a SYNC command 44. The SYNC command tells the RFID transponder that communication to the transponders is beginning. In the preferred embodiment, the SYNC pulse has a duration of 1 μs, and is a period during which the RF illumination of the transponders is heavily attenuated by the interrogating transceiver.

A value of ZERO for a single binary digit sent to the transponder is seen at 46. In the preferred embodiment, this symbol is composed of 3 μs of RF illumination, followed by 1 μs during which the RF illumination is attenuated, and another 4 μs of RF illumination.

A value of ONE for a single binary digit sent to the transponder is seen at 48. in the preferred embodiment, this symbol is composed of 7 μs of RF illumination, followed by 1 μs during which the RF illumination is attenuated.

A READ symbol 50 commands the transponder to send out one bit of its ID number. After transmitting the bit, the transponder increments its internal memory pointer and awaits further commands from the interrogating transceiver. In the preferred embodiment, this command consists of 1 μs during which the RF illumination is attenuated, followed by a period of continuous RF illumination (which must be less than the RESET's duration) during which the transponder may communicate with the interrogating transceiver by shorting its antenna for brief intervals. After a RESET command, the READ command cannot be issued until a CHANGE1 command is issued.

A MATCH symbol 52 commands the transponder to send out a MATCH acknowledgement symbol if the transponder's ID bits match those sent by the interrogating transceiver since the last RESET command was issued. In the preferred embodiment, the MATCH symbol is identical to the READ command, but is differentiated from the READ command by the fact that no CHANGE commands have been sent between the RESET command and the MATCH command. Furthermore, the MATCH command can be received only after the correct number of bits have been received from the interrogating transceiver.

A CHANGE1 symbol 54 commands the transponder to switch into the READ mode. In the preferred embodiment, this symbol is composed of 3 μs of RF illumination, followed by 1 μs during which the RF illumination is attenuated, followed by another 3 μs of RF illumination, followed by another 1 μs during which the RF illumination is attenuated. This command also has the same effect as a READ command, in that it causes the transponder to send out one bit of its ID number.

A CHANGE2 symbol 56 commands the transponder to go into a sleep state if the last READ command issued to the transponder caused the transponder to send a zero to the interrogating transceiver. This command is typically issued when both a ONE and a ZERO symbol are transmitted back from the two or more transponders in response to a READ command. This symbol is composed of a period of 3 μs of continuous RF illumination, followed by 1 μs during which the RF illumination is attenuated.

Figure 5:
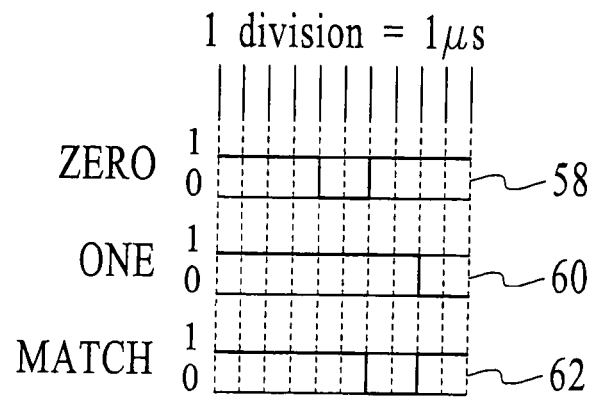
FIG. 5 shows the symbol alphabet used by the transponder in the preferred embodiment to communicate with the interrogating transceiver.

FIG. 5 is a graphical representation of a preferred embodiment of the communication symbols used to transmit data from the RFID transponders to the interrogating transceivers. The RFID transponder communicates with the interrogating transceiver by shorting its antenna during periods when the interrogating transceiver is transmitting a continuous level of RF illumination. By shorting its antenna, the transponder creates a reflection of RF energy that the interrogating transceiver can detect. The RFID transponder's alphabet of communication symbols include:

A ZERO binary value 58 contained in the RFID transponder's ID number in the preferred embodiment consists of a waiting period of 4 μs after the last SYNC pulse received from interrogating transceiver followed by a 2 μs period during which the transponder shorts its antenna. This symbol will only be sent immediately after RF illumination is resumed following a READ, CHANGE1, or CHANGE2 command from the interrogating transceiver.

A ONE binary value 60 contained in the RFID transponder's ID number in the preferred embodiment consists of a waiting period of 8 µs after the last SYNC pulse received from interrogating transceiver followed by a 2 µs period during which the transponder shorts its antenna. This symbol will only be sent immediately after RF illumination is resumed following a READ, CHANGE1, or CHANGE2 command from the interrogating transceiver.

A MATCH symbol 62 consists of a waiting period of 6 µs followed by a 2 µs period during which the transponder shorts its antenna. This symbol will only be sent immediately after RF illumination is resumed following a MATCH command from the interrogating transceiver, and only if the RFID's transponder ID matches the number transmitted by the interrogating transceiver. The MATCH symbol will be repeated as long as the interrogating transceiver continues to send successive MATCH commands.

Figure 6:
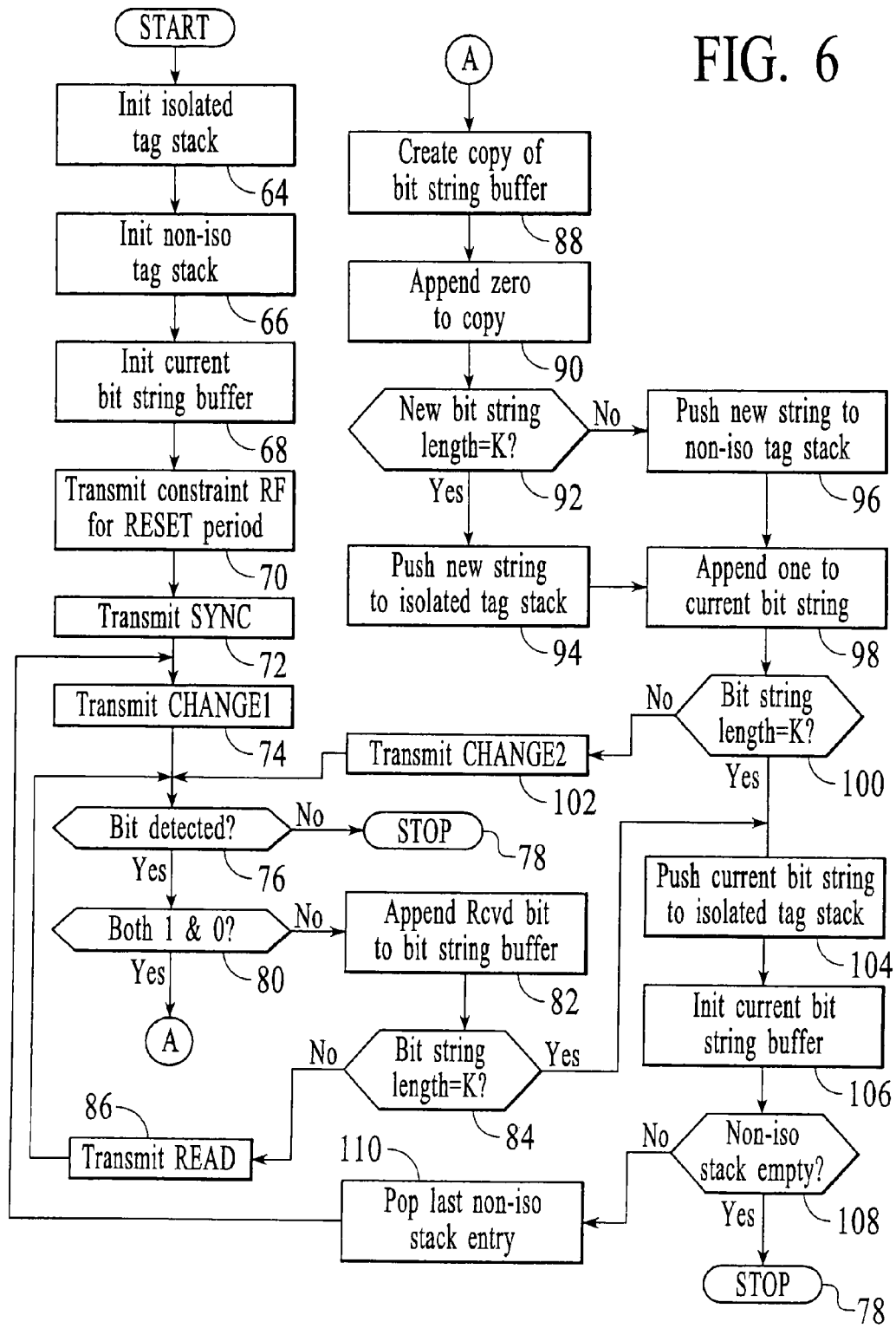
FIG. 6 shows a flow chart of a representative algorithm for implementing the invention as it pertains to an interrogation transceiver.

FIG. 6 illustrates an algorithm in accordance with preferred embodiments of the present invention performed by the interrogating transceiver to read multiple transponders. The algorithm makes use of an abstract data structure known in the art of computer science as a stack. Data is added as the stack in a "push" operation. A "pop" operation will remove the last "pushed" data element, and return the data "popped." "K" represents the number of ID bits that form the unique ID of the transponder.

In the preferred embodiment, at step 64 the interrogating system initializes the isolated transponder stack and continues at step 66. At step 66, the system initializes the non-isolated transponder stack and proceeds to step 68. At step 68, the interrogating system initializes the current bit string buffer and proceeds to step 70. At step 70, the system transmits a constant level of RF power for the duration of the RESET period and continues to step 72. At step 72, the interrogating system transmits a SYNC command and proceeds to step 74. At step 74, the system transmits a CHANGE1 command and continues to step 76.

At step 76, the interrogating system waits to receive a bit from the RF transponder; if no bit is detected, then the system proceeds to step 78; if a bit is detected, then the system proceeds to step 80. At step 78, the interrogating system stops because the algorithm is completed and the isolated transponder stack contains the identified transponder IDs. At step 80, the interrogating system determines if it has detected a one and a zero: if both a one and a zero are present, then the system continues to step 88; if not, then the system proceeds to step 82. At step 82, the interrogating system records the bit received by appending it to the bit string buffer, and proceeds to step 84. At step 84, the system determines if the length of the bit string is equal to K bits; if this criterion applies, then the system proceeds to step 104; if this criterion does not apply, then the system proceeds to step 86. At step 86, the interrogating system transmits a READ command and returns to step 76.

At step 80, if the interrogating system detects both a one and a zero, then it proceeds to step 88. At step 88, the system creates a copy of the current bit string and continues to step 90, where it appends a zero to the newly created copy of the bit string. The system then proceeds to step 92. At step 92, the interrogating system determines if the length of the newly created bit string is equal to K bits; if this criterion applies, then the system proceeds to step 94; if this criterion does not apply, then the system proceeds to step 96. At step 94, the interrogating system pushes the new bit string to the isolated transponder stack and continues to step 98. At step 96, the system pushes the new bit string to the non-isolated transponder stack and proceeds to step 98. At step 98, the interrogating system records a one as the bit received by appending it to the bit string buffer, and continues to step 100. At step 100, the interrogating system determines if the length of the bit string is equal to K bits again; if this criterion now applies, then the system proceeds to step 104; if this criterion does not apply, then the system proceeds to step 102, where it transmits a CHANGE2 command, and returns to step 76.

At step 104, assuming the length of the bit string is equal to K bits, the system pushes the current bit string to the isolated transponder stack, and continues to step 106. At step 106, the system initializes the current bit string buffer and proceeds to step 108. At step 108, the system determines if the non-isolated transponder stack is empty; if this criterion applies, then the system proceeds to step 78, where the system stops and the algorithm is completed; however, if this criterion does not apply, then the system proceeds to step 110. At step 110, the interrogating system pops the last entry from the non-isolated stack, and returns to step 74. As previously described, the CHANGE1 command instructs the transponder to switch to the READ mode, whereupon the transponder will serially shift out the bits of its ID number in response to serial commands from the interrogating transceiver as illustrated in FIG. 6.

Figure 7:
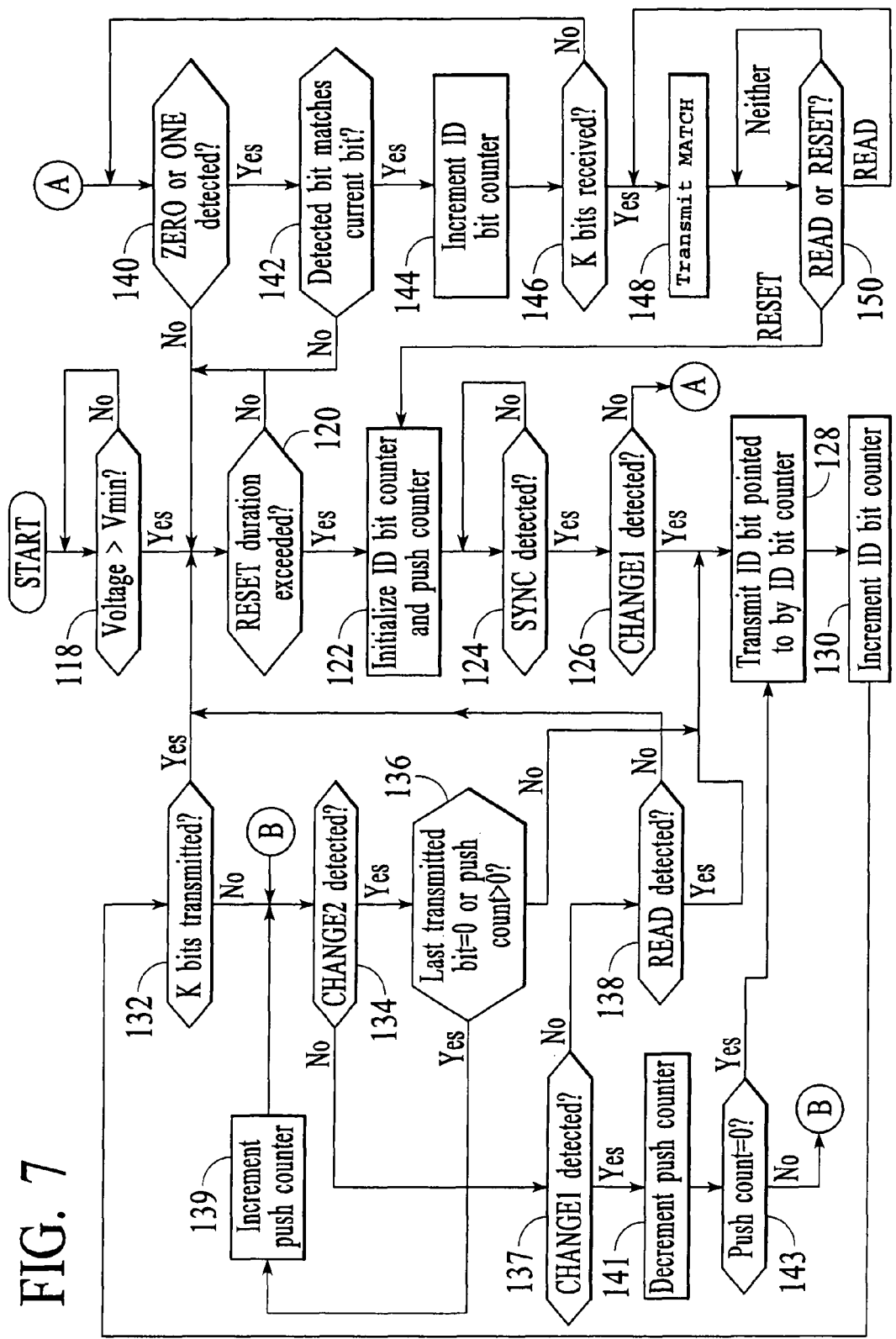
FIG. 7 shows a flow chart of a representative algorithm for implementing the invention as it pertains to a transponder.

FIG. 7 illustrates an algorithm that may be performed by each of the plurality of RFID transponders. Again, "K" represents the number of ID bits that form the unique ID of the transponder.

At step 118, the transponder determines if the internal voltage level exceeds the voltage minimum. If the internal voltage level is greater than Voltage minimum, then the system proceeds to step 120. However, if the internal voltage level is less than the Voltage minimum, then the system returns to step 118. (If at any time the RF illumination is not sufficient to keep the internal voltage at a satisfactory level, the device will return to step 118. This condition may be caused by movement of the transponder, movement of the interrogating system, and/or a change in the level of power being transmitted by the interrogating system.) At step 120, the device determines if the RF illumination has been detected for a period equal to or greater than the RESET period. If this criterion applies, then the device continues to step 122; if this criterion does not apply, then the device repeats step 120.

At step 122, the device resets the transponder internal ID bit counter and proceeds to step 124, where the SYNC command may be detected; if this applies, then the device continues to step 126; if this criterion does not apply, then the device repeats step 124. At step 126, the CHANGE1 command may be detected; if this criterion applies, then the device proceeds to step 128; if this does not apply, then the device proceeds to step 140. At step 128, the device transmits the ID bit pointed to by the ID bit counter, and continues to step 130. At step 130, the device adds one to the ID bit counter, and proceeds to step 132. At step 132, the device determines if K bits have been transmitted; if this criterion applies, then the device returns to step 120; if this does not apply, then the device proceeds to step 134. At step 134, the device determines if the CHANGE2 command is detected; if this applies, then the device continues to step 136; if it does not apply, then the device proceeds to step 137 to determine if the CHANGE1 command is detected. At step 136, the device determines if the last bit transmitted is equal to zero or if the push counter value is greater than zero; if this applies, then the device increments a push counter at step 139. If this criterion does not apply, then the device returns to step 128. If a CHANGE1 command is detected at step 137 the push counter is decremented at step 141. If a CHANGE1 command is not detected the process continues to see if a READ command is detected. If at step 138, the device detects the READ command then the system returns to step 128; if it does not detect READ, then the device proceeds to step 120. After the push counter is decremented at step 141, the push count is inspected at step 143 to see if the count is zero. If it is zero the device returns to step 128. If it is not zero the device proceeds to step 140.

At step 140, device determines if a ZERO or ONE is detected; if so, then the device proceeds to step 142; if not, then the device returns to step 120. At step 142, the device determines if the bit detected matches the bit in this transponder's ID number that is pointed to by the current ID bit pointer; if so, then the device proceeds to step 144; if not, then the device returns to step 120. At step 144, the device adds one to the ID bit pointer and continues to step 146. At step 146, the device inquires if the ID bit counter equals K; if so, then the device proceeds to step 148; if not, then the device returns to step 140. At step 148, the device issues a MATCH command and proceeds to step 150.

At step 150, the device determines if the READ or RESET commands are detected; if the READ command is detected, then the device returns to step 148; if the RESET period has elapsed, then the device returns to step 122 to initialize an ID bit counter. If neither the READ nor RESET commands are detected, then the device repeats step 150. One skilled in the art should recognize that the present invention could be implemented using variations in the order and number of steps in the algorithms in the interrogating system and in the transponder devices without departing from the spirit of the invention. Other details of the algorithms and overall processing flow in accordance with the described, illustrative preferred embodiments will be apparent from the details in the figures.

The shapes and durations of the symbols used to implement the invention are somewhat arbitrary, though the following relationships must hold in the preferred embodiment. First, the RESET duration must be greater than the duration of all other periods of continuous RF illumination encountered in the protocol, either due to a single symbol, or due to the concatenation of two or more symbols. Second, all symbols other than RESET must have a period of RE attenuation of a duration, sufficient to be detected by the RFID transponder. Third, CHANGE1 and CHANGE2 symbols must contain periods of RF attenuation, which occur before the end of either of the initial waiting periods contained in the RFID transponder's ZERO and ONE symbols. One skilled in the art also should recognize that the particular symbol shapes and symbol timing could be altered to produce variations of the previously described protocol, which are equivalent in function, and which retain the novel advantages of the protocol.

Figure 8:
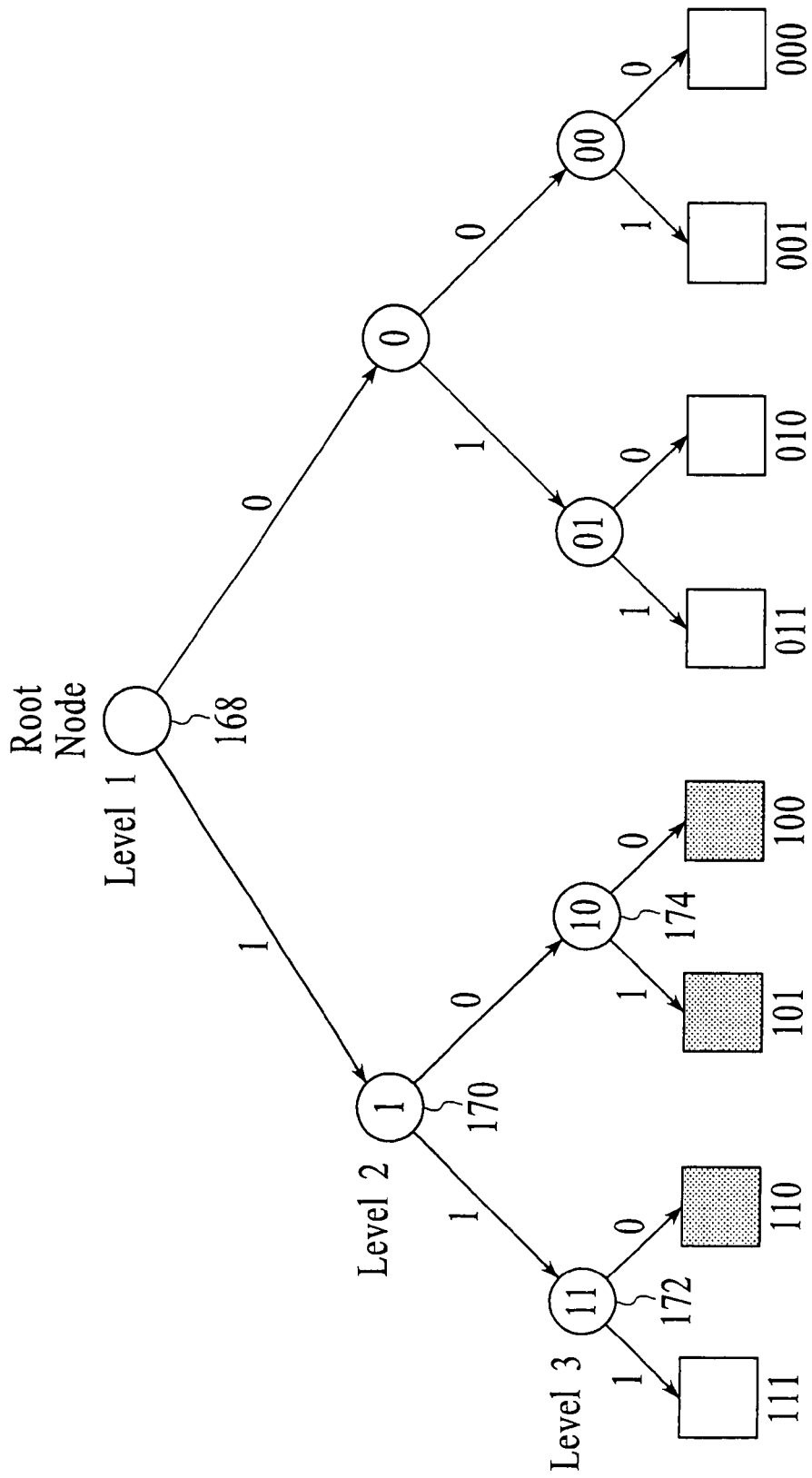
FIG. 8 shows a binary tree for illustrating the operation of the transponder protocol in a binary case.

FIG. 8 is a diagram of a binary tree representing the search space of the method within the preferred embodiment. The diagram illustrates an exemplary embodiment of the transponder identification process. The dark arrows represent actual responses received when interrogating at the node from which the arrows originate. The transponder ID numbers are binary and 3 bits in length in this example. This will permit up to $2^3=8$ unique transponder ID numbers. One skilled in the art should recognize that the protocol can easily be extended to work with ID numbers of any finite length, and using any number system. For binary IDs of length K, there will be $2^K$ unique transponder ID numbers. In the example, transponders with binary IDs of 110, 101, and 100 are assumed to be present in the field, wherein the leftmost digit of the numbers as listed are the first to be interrogated.

As illustrated in FIG. 8, the search begins at 168, level 1, at the root node of the tree. At each node, the branches emerging from the bottom of the node represent the possible responses to an interrogation at that node. To start the transponder identification process, the interrogating system begins transmitting constant RF illumination to the transponders (FIG. 6, step 70). The constant illumination is maintained long enough for the transponders to generate an internal voltage sufficient for powering the transponders, and long enough for the transponders to complete any initialization process necessary. This includes the time required for the RESET command to be detected in the preferred embodiment. After the RESET symbol is detected by the transponders, the transponders will initialize their ID bit counters to point to the first bit to be interrogated (FIG. 7, step 122).

The interrogating system will then command the transponders to respond with their first digit (FIG. 6, steps 72 & 74). This interrogation can be viewed as taking place at the root node 168 of the binary tree in FIG. 8. In the preferred embodiment, the interrogation system would send a SYNC symbol followed by a CHANGE1 symbol. The CHANGE1 symbol causes all transponders to respond with the first digit of their ID numbers. Since all transponders have a 1 as the MSB in this example, all transponders respond with a ONE symbol (FIG. 7, step 128). This indicates to the interrogation system that at least one transponder is present in the field which contains a 1 as the first digit of its ID number. The interrogation system would then record that the current digit string is simply "1" (FIG. 6, step 82). Each transponder will increment its respective ID bit counter after transmitting its ID digit (FIG. 7, step 130).

The interrogating system will then send a command to the transponders to request that each transponder respond with its second digit. In the preferred embodiment, this command would take the form of a READ symbol (FIG. 6, step 86), and can be viewed as taking place on the leftmost node 170 of level 2 in FIG. 8. The 110 transponder would respond with a ONE symbol, while the 101 and 100 transponders would respond with ZERO symbols (FIG. 7, step 128). Each transponder will increment its respective ID bit counter after transmitting its ID digit (FIG. 7, step 130). The interrogating system would then conclude that at least two transponders are present in the field (FIG. 6, step 88). It would then record that the current digit string is "11" (FIG. 6, step 98), and also record that there is at least one transponder whose ID begins with "10" that needs to be isolated at a later time (FIG. 6, step 96).

The interrogating system would then send a command (FIG. 6, step 102) to force all transponders which responded with a digit which was not ONE to increment their respective push counters (FIG. 7, step 139). This command would take the form of a CHANGE2 symbol in the preferred embodiment. The CHANGE2 command simultaneously causes those transponders which responded with a ZERO to increment their push counters (FIG. 7, step 139), and causes those transponders which responded with a ONE to respond with the next digit (FIG. 7, step 128). This can be viewed as taking place at the leftmost node 172 on level 3 of FIG. 8. At this point, only the transponder with ID 110 will respond, and it will respond with a ZERO symbol. The interrogation'system would then record the 110 coded transponder as an isolated. transponder (FIG. 6, step 104).

The interrogation system then sends out a CHANGE1 command (FIG. 6, step 74) to cause all transponders with non-zero push counter values to decrement their push counters (FIG. 7, steps 137, 141). Each transponder whose push counter value thereby becomes zero (FIG. 7, step 143)

will also respond with the next bit value (FIG. 7, step 128) following the bit value that was interrogated just prior to incrementing their push counter from zero to one. This can be viewed as taking place at the node 174 which is second from the left on level 3 of FIG. 8. The 100 transponder will respond with a ZERO symbol, and the 101 transponder will respond with a ONE symbol (FIG. 7, step 128). The interrogation system then may conclude that there are at least two transponders in the field with IDs beginning with "10." Since IDs are in this case only 3 bits long, the 101 and 100 transponders will enter an idle state until the next RESET symbol is received (FIG. 7, step 120). The interrogation system can also assume that, since the final bit was just interrogated (FIG. 6, step 100), transponders with IDs 100 and 101 are present in the field. The interrogation system then adds 100 (FIG. 6, step 94) and 101 (FIG. 6, step 104) to the list of isolated transponder IDs.

At this point, the interrogation system may assume that all tags in the field at the beginning of the protocol execution have been isolated. The interrogation system then restarts the protocol (FIG. 6, step 64) to find additional tags which may have entered the field since the previous interrogation and identification.

At this point examples are discussed to illustrate some of the details in the method and apparatus of the present invention.

FIG. 6, as previously discussed, represents the steps in the process of the present invention performed by the transceiver 2. When multiple bit values are detected at step 80 in the data received from transponders 6 in the field, the process advances to step 88 as shown. In the example herein where a series of binary digits constitutes a transponder ID, the transceiver 2 has received both a 1 and a 0 in response to its latest request for the next bit in the binary identification numbers of non-isolated transponders. A copy of the bit string buffer (the sequence of bits received previously from non-isolated transponders) is made at step 88. A Zero is appended to the copy of the previously received bit sequence (step 90). The transceiver "looks at" the resulting series of bits. This may be seen as entering the binary tree of FIG. 8 and moving appropriately through the tree from node to node in levels 1, 2 or 3 in the figure. If at level 2, for example, and if a 1 digit was in the copy, then the proposed series of bits for further investigation by the system would be 10 at node 174. At step 92 it is determined if the "new" bit string (10) is of length K. If K is 3, as in this example, the answer is "no" and the "new" string (10) is pushed to the non-isolated tag stack at step 96. At step 98 the current bit string buffer (bits received previously from non-isolated transponders), 1 in our example, has a 1 appended to it. If at level 2 in FIG. 8 and at node 170, this amounts to constructing the binary series 11, seen at node 172 in level 3. An inquiry at step 100 regarding whether the 11 bit string has a length of K (3 in our example) is answered "no", and a CHANGE2 transmission is issued by the transceiver. This transmission, it will be recalled, is usually sent when more than one value of response is received from the field of transponders 6 (in this example a 1 and a 0). The CHANGE2 command puts any transponder to "sleep" if it has responded with a zero in answer to the last READ or CHANGE1 command. Thus, the transponder just queried and having a 1 and a zero as the "most" and "next most" significant bits in its incomplete ID number is put to "sleep" and will be "awakened" to complete its identification as described hereinafter. The CHANGE 1 command of step 74 in FIG. 6 is then transmitted by the transceiver 2 to obtain more ID bit information. All non-isolated transponders 6 not in a "sleep" state then respond with their next digit and the transceiver determines at step 76 if a bit is detected.

Suppose the current or previously received sequence of bits from non-isolated transponders is 10 as seen at node 174, level 3 of FIG. 8. Returning to step 92 in FIG. 6, the appended zero from step 90 now puts the "new" or copied bit string at length=K (3 in our example). This is represented in FIG. 8 as going from node 174, level 3 downwardly to the right so that one of the transponders in the field is identified as ID100. The 100 transponder is pushed to the isolated tag stack at subsequent step 94 since it is now completely identified. The process proceeds to step 98, where a 1 is appended to the current bit string or previously received sequence of bits, 10. At step 100 the bit string length is determined to be equal to K (3) since the big string is 101. This is seen in FIG. 8 as proceeding downwardly left from node 174, level 3, in FIG. 8. Another transponder in the field is thus identified at 101 and the ID is pushed to the isolated tag stack at step 104. The bit string buffer is initialized at step 106 and the (contents of the) non-isolated transponder stack is inspected at step 108. If the non-isolated stack is empty, all transponders in the field are identified and the process is stopped at step 78. If the non-isolated stack is not empty, the last pushed data element in the non-isolated stack entry (the last pushed entry in the example just described was a zero at step 96 to arrive at a 10 series of bits at node 174) is "popped" (removed) at step 110 and the transceiver 2 transmits a CHANGE1 to command each of transponders 6 present in the field and not in a "sleep state" to decrement its push counter and then to subsequently send the next bit value in its ID number.

Figure 1:
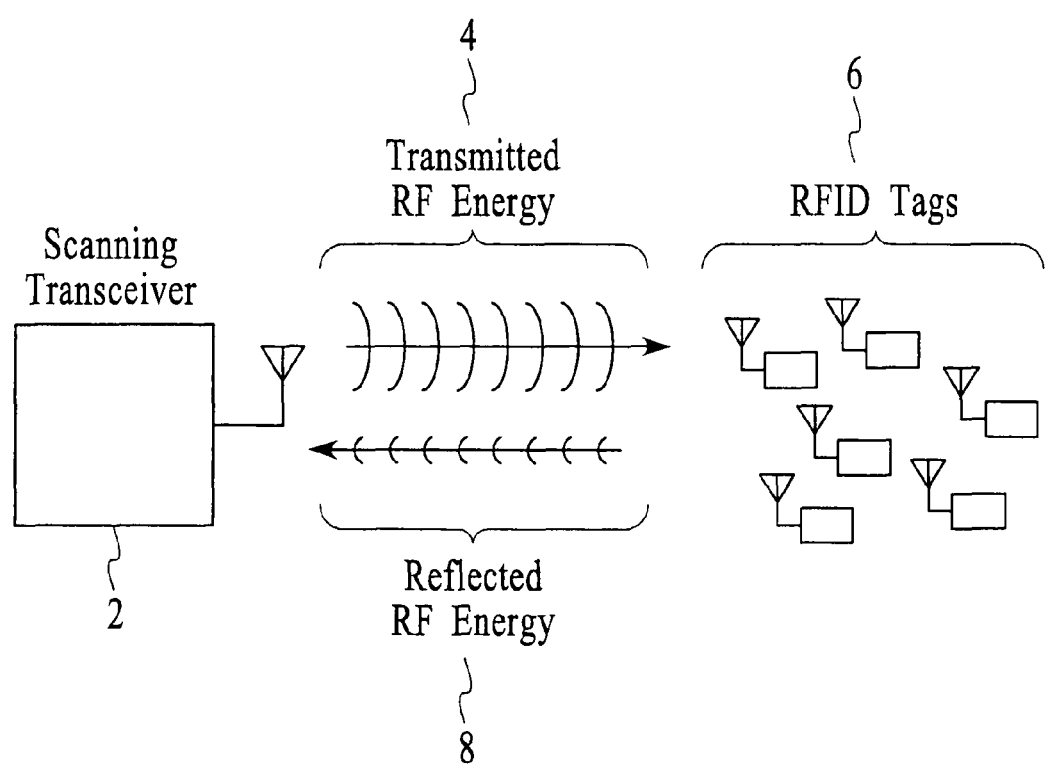
FIG. 1 is a block diagram for a typical RFID system.
Figure 2:
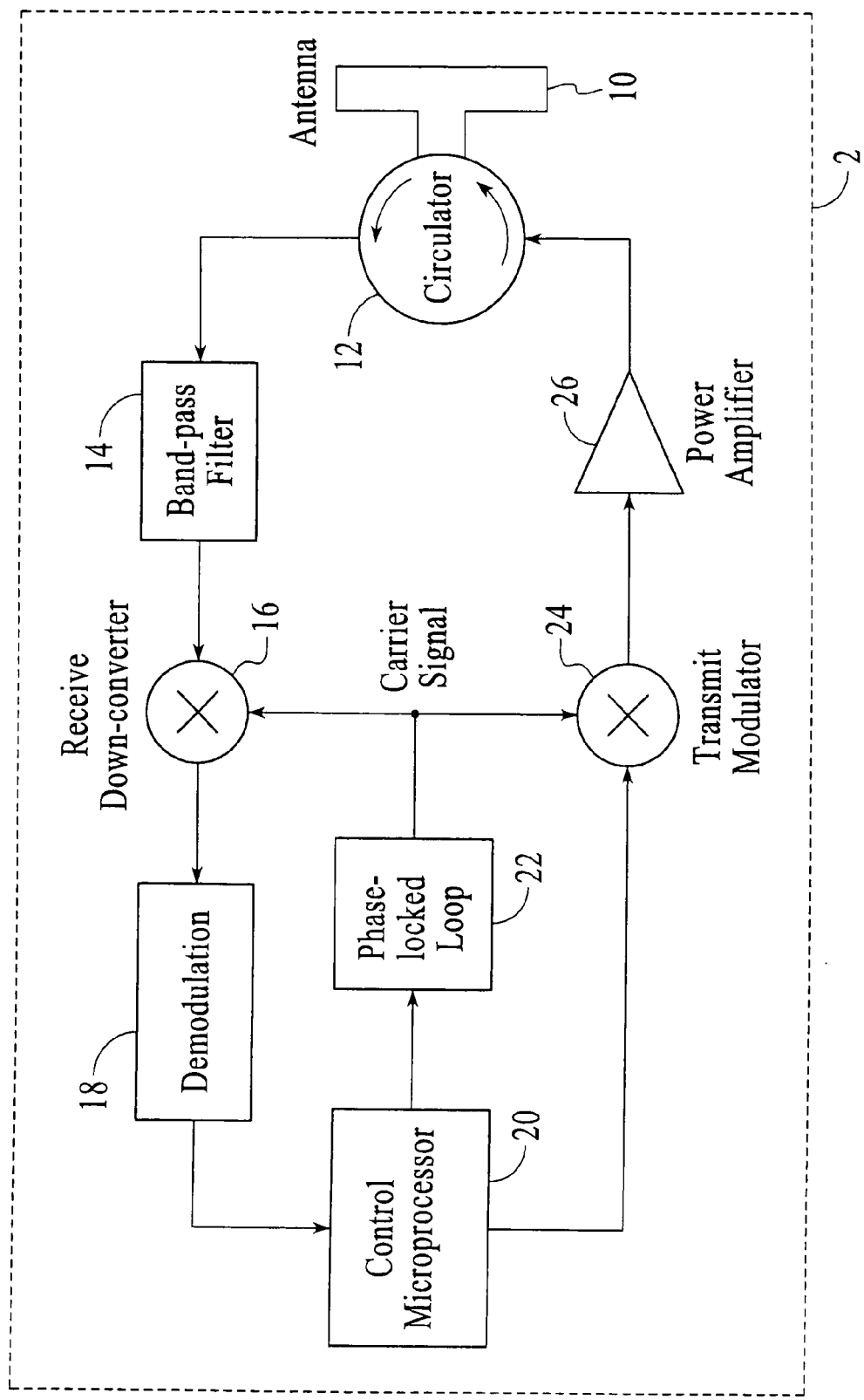
FIG. 2 is a block diagram for a typical passive RFID transceiver.
Figure 3:
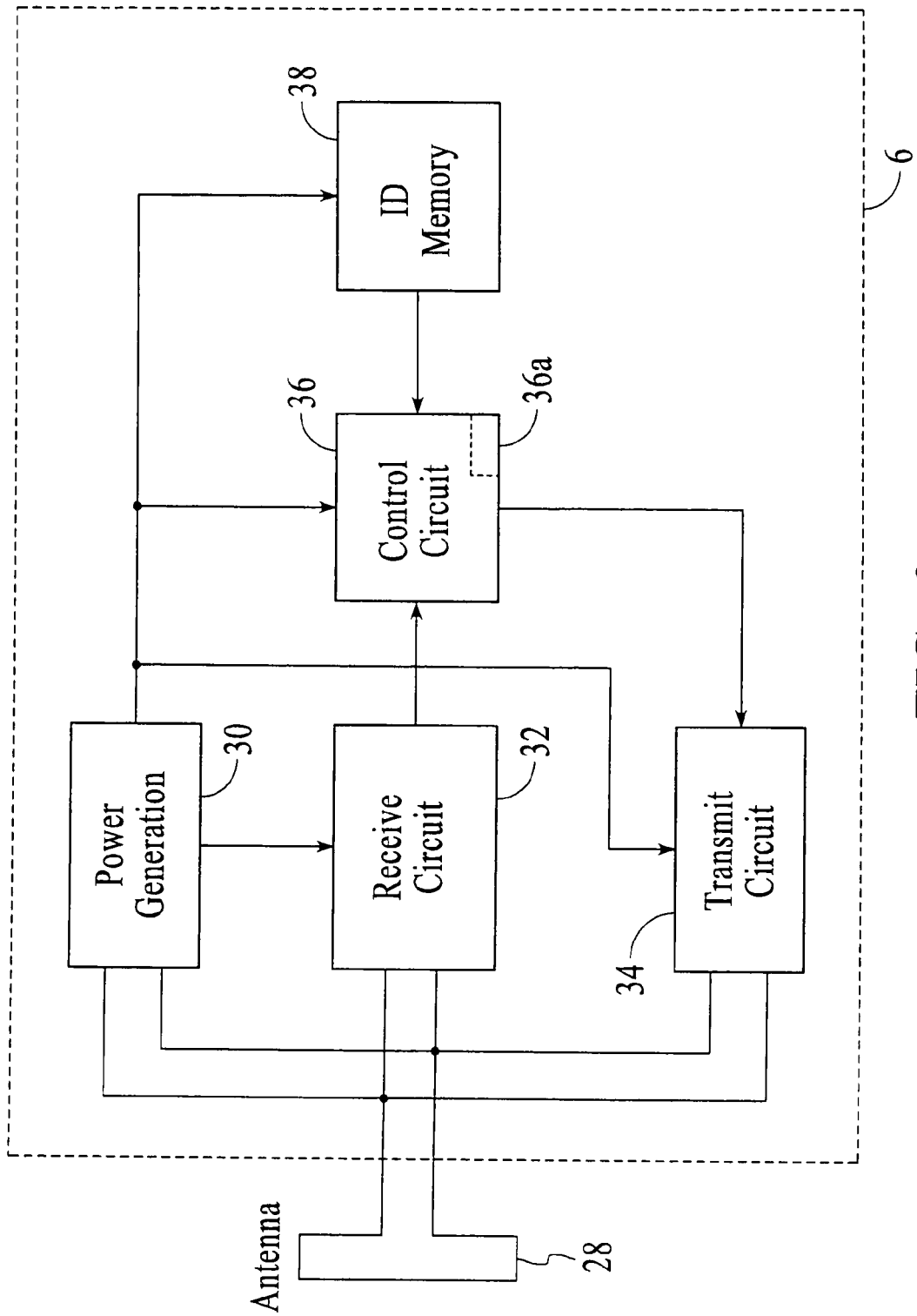
FIG. 3 is a block diagram for a typical RFID transponder.

Looking at FIG. 7, which represents the steps in the process performed by the transponders 6, push counter operations are performed in steps 139 and 141. A push counter is included in each transponder 6 (FIG. 3) as part 36a of the control circuit 36. The push counter functions in the process and structure of the invention whereby transponders in the field that have been put in a "sleep" state are maintained in the disclosed system to be later "awakened" to transmit subsequent ID bits to the transceiver 2 upon the transceiver's command. The transponder internal bit counter in memory 38 (FIG. 3) keeps track of the bits in its ID that have been transmitted. Each transmitted bit is recorded therein in step 130 of FIG. 7. The bit counter is queried in step 132 to determine if K ID bits have been transmitted by the transponder. If K bits have been transmitted by that transponder it will enter an idle mode, waiting until the next RESET time duration has been exceeded at step 120. If K bits have not been transmitted by the transponder, a query is made as to whether a CHANGE 2 signal is detected at step 134. As stated in the reference to step 102 in FIG. 6 herein before, the CHANGE 2 command is transmitted by a transceiver 2 to place a transponder 6 in the "sleep" state when the last bit transmitted by it is a zero. If CHANGE 2 is detected the transponder asks itself if either its last transmitted bit was a zero or if the push counter 36a in the transponder is greater than zero. If either question is answered "yes", a count within the push counter is incremented at step 139 and the process returns to step 134 to see if a CHANGE2 command is detected. If the answer is now "no", because no multi-valued bits were received by the transceiver as described for FIG. 6, then the transponder queries in step 137 whether a CHANGE1 is detected. When the answer to step 137 is "yes", the push counter is decremented in step 141. Next the question is posed in step 143 as to whether the push count is zero. In this description, if a CHANGE2 was first detected and the last transmitted bit was zero, and in the next pass by step 134 no CHANGE2 was detected, then if CHANGE1 is detected at step 137, one increment (step 139) and one decrement (step 141) would produce a zero push count. Consequently, the answer to the query of step 143 is "yes" and the next bit in the transponder's ID is transmitted at step 128. As stated previously, the transponder's ID bit counter is incremented at step 130 and the transmitted bit count is compared with K at step 132. As before, a determination that K bits have been transmitted means the transponder is fully identified by the transceiver and the transponder awaits passage of the RESET duration at step 120. On the other hand if less than K bits have been transmitted and CHANGE2 is detected at step 134 while CHANGE1 in step 137 is not detected a READ command is queried in step 138. No READ command detection means no transmission at step 86 in FIG. 6. Thus, the bit string length is K in FIG. 6 and the bit string is pushed to the isolated stack. This puts the transponder in idle mode, waiting for the RESET time duration to be exceeded. If a READ command is detected, the next ID bit for the transponder is transmitted in step 128 and recorded in step 130. If, in the next round of inquiries K bits have not been transmitted (step 132), CHANGE2 is detected (step 134) and either the last transmitted bit was a 1 or the transponder push count is zero (step 136), the next bit in the ID is transmitted (step 128) and recorded (step 130). It is apparent from the foregoing that transponders transmissions in the non-isolated stack are remembered by and directed by the transceivers. It is also apparent that the transponders that are not isolated will be put to sleep by a CHANGE2 command when they transmit a zero bit in their ID bit string (other than the least significant bit), but will be "awakened" by decrements to their push count when CHANGE1 is detected without a CHANGE2 detection. This means a zero bit in a transponder ID bit string can be transmitted by a transponder and received by the transceiver when only a zero bit (or bits) is received. As a result the bit ID numbers are received at the transceiver in descending numerical order and the transceiver only has to transmit RESET and SYNC one time during an entire acquisition of identifications for all tags (transponders) in the field. Thus, retransmission of bits in a popped string less than K bits is avoided.

It should be recognized by one skilled in the art that the algorithm may be adapted to situations in which digits can take on more than two possible values. In such cases, the simple incrementing and decrementing of the push counters becomes somewhat more complex. Instead of an increment operation, transponders which have non-zero push counter values will add N−1 to their push counters, where N is the number of possible digit values. Transponders with zero valued push counters will add N−1 minus the value of their just-interrogated digit. Decrement operations may remain discrete, but the interrogating device could also command all transponders to subtract a certain number from their respective push counters in order to skip over digit values at a specific node which are known not to be present in any transponder present in the field.

One skilled in the art should also recognize that the enumeration and assignment of integer values to digits is arbitrary. The use of specific integer values in the description of the algorithm is strictly for the purpose of facilitating the description of the algorithm. Alternate enumerations may be used to implement the invention without departing from the spirit of the invention.

In accordance with the present invention as described above, the following exemplary methods and apparatus may be provided, it being understood that certain steps and elements may be combined, consistent with the foregoing description, as will be appreciated by one skilled in the art.

A method for identifying each of a plurality of objects using an interrogation process on a single communication channel, wherein an interrogating device capable of simultaneously communicating with objects to be identified has access to the communication channel; each object to be identified contains within it a representation of a complete identification number in the form of a plurality of digits, enumerated in an arbitrary predetermined sequence; each digit having a value which may be mapped one-to-one to an integer value from 0 to N−1, where N is the number of possible digit values; each object has the ability to communicate with the interrogating device, but not necessarily with other like objects; each object contains an internal counter capable of counting from zero up to at least the number of digits contained within the identification number times N−1, where N is again the number of possible digit values, said counter being hereafter referred to as the push counter; each object has the ability to communicate to the interrogating device predetermined responses to indicate the value of any of the digits contained in its respective identification number, said responses chosen such that all responses may be unambiguously discerned by the interrogating device even if two or more types of responses are returned simultaneously by the objects being interrogated, and all of said responses are distinguishable from the absence of any response; and the interrogation method comprises the steps of: (a) activating said plurality of objects, thereby enabling them to participate in the interrogation process; (b) interrogating a single digit from all currently activated objects, according to the predetermined sequence chosen for each object, from all of said plurality of objects to obtain one of the predetermined responses from each of said objects indicating the value of the digit being interrogated within the respective objects; (c) recording the value of said responses received in step (b); (d) if two or more possible responses are detected by the interrogating device in step (b), then signaling each of those objects which responded with any but the highest valued possible digit to add the difference between (N−1) and its integer digit value to its push counter; (e) signaling each of said objects which was signaled to increase its push counter in step (d) to no longer respond until signaled to decrement its push counter and its push counter reaches zero; (f) recording the incomplete sequence of identification digits received thus far since the last execution of step (a) or retrieved in step (l) for those objects which were signaled to increase their push counters in steps (d) and (e); (g) if two or more possible responses were detected by the interrogating device in step (b), then signaling each of said objects which had non-zero push counter value prior to step (d) to add N−1 to its counter value; (h) if only one response was detected in step (b), appending the value received to the record of the sequence of digits received thus far since the most recent execution of step (a) or retrieved in step (l); (i) if no object response was detected in step (b), then an error is presumed to have occurred, and the method is terminated; (j) repeating said steps (b), (c), (d), (e), (f), (g), (h) and (i) until the complete identification sequence is obtained for at least one of said objects; (k) recording the complete identification number(s) received as having been successfully read, wherein more than one identification number may be identified if multiple responses are detected by the interrogation device upon interrogating the last digit on the identification number; (l) retrieving the last incomplete identification sequence recorded in step (f, if any, otherwise proceeding to step (n); (m) signaling the plurality of transponders which have a non-zero push counter value to decrease their push counter values such that at least one transponder contains a non-zero push counter value, those transponders whose push-counters become zero becoming active and responding with the next digit; and (n) repeating said steps (b), (c), (d), (e), (f), (g), (h), (i), (j), (k), (l) and (m) until all of the incomplete identification sequences recorded in step (d) have been exhausted, and said identification information is unambiguously obtained from said plurality of objects in said communication channel.

The foregoing method may be implemented, wherein a response is not detected in step (b), comprising the modification of step (i) wherein the method is started anew instead of being terminated. The foregoing method may be implemented, wherein two or more responses are received in step (b) in response to the interrogation of the last digit, comprising a modified step (k) wherein multiple complete identification numbers are recorded, and steps (d), (e), (f), (g), (h), (i) and (j) may be skipped for the last digit. The foregoing method may be implemented, wherein two or more signaling operations of steps (d), (e), and (g) are combined into a singled step.

Also in accordance with embodiments of the present invention, a method for identifying each of a plurality of objects using an interrogation process on a single communication channel, wherein: an interrogating device capable of simultaneously communicating with objects to be identified has access to the communication channel; each object to be identified contains within it a representation of an identification number in the form of a plurality of binary digits, hereafter bits, enumerated in an arbitrary predetermined sequence; each digit having a value of zero or one; each object has the ability to communicate with the interrogating device, but not necessarily with other like objects; each object contains an internal counter capable of counting from zero up to at least the number of digits contained within the identification number, said counter being hereafter referred to as the push counter; each object has the ability to communicate to the interrogating device predetermined responses to indicate the value of any of the digits contained in its respective identification number, said responses chosen such that all responses may be unambiguously discerned by the interrogating device even if two responses are returned simultaneously by the objects being interrogated, and all of said responses are distinguishable from the absence of any response and the interrogation method comprises the steps of: (a) activating said plurality of objects, enabling them to participate in the interrogation process; (b) interrogating a single bit, according to the predetermined sequence chosen for each object, from all of said plurality of objects to obtain one of the predetermined responses from each of said objects indicating the value of the bit being interrogated within the respective objects; (c) recording the value of said responses upon receiving said predetermined responses; (d) if both possible responses were detected by the interrogating device in step (b), then signaling each of those objects which responded with any but one of the possible digit values to increment its push counter; (e) if both possible responses were detected by the interrogating device in step (b), signaling each of said objects which incremented its push counter in step (d) to no longer respond until signaled to decrement its push counter and its push counter reaches zero; (f) recording the incomplete sequence of identification digits received thus far since the last execution of step (a) or retrieved in step (l) for those objects which were signaled to increase their push counters in steps (d) and (e); (g) if both possible responses were detected by the interrogating device in step (b), then signaling each of said objects which had a non-zero push counter value prior to step (d) to increment its counters in response to said signal; (h) if only one response is detected in step (b), appending the value received to the record of the sequence of bits received thus far since the most recent execution of step (a) or retrieved in step (l); (i) if no object response is detected, then an error is presumed to have occurred, and the method is terminated; (j) repeating said steps (b), (c), (d), (e), (f), (g), (h) and (i) until all of said sequential digits are obtained for at least one of said objects; (k) recording the complete identification number(s) received as having been successfully read, wherein more than one identification number may be identified if multiple responses are detected by the interrogation device upon interrogating the last digit on the identification number; (l) retrieving the last incomplete identification sequence recorded in step (f), if any, otherwise proceeding to step (n); (m) signaling the plurality of transponders which have a non-zero push counter value to decrement their push counter values such that at least one transponder contains a non-zero push counter value, those transponders whose push-counters become zero becoming active and responding with the next digit; and (n) repeating said steps (b), (c), (d), (e), (f), (g), (h), (i), (j), (k), (l) and (m) until all of the incomplete identification sequences recorded in step (d) have been exhausted, and said identification information is unambiguously obtained from said plurality of objects in said communication channel.

The foregoing method may be implemented, wherein a response is not detected in step (b), comprising the modification of step (i) wherein the method is started anew instead of being terminated. The foregoing method may be implemented, wherein two responses are received in step (b) in response to the interrogation of the last digit, comprising a modified step (k) wherein multiple complete identification numbers are recorded, and steps (d), (e), (f), (g), (h), (i) and (j) may be skipped for the last digit. The foregoing method may be implemented, wherein the signaling operations of steps (d) and (e) are combined into a single step. The foregoing method may be implemented, wherein the signaling operations of steps (d) and (g) are combined into a single step. The foregoing method may be implemented, wherein the signaling operations of steps (e) and (g) are combined into a single step. The foregoing method may be implemented, wherein the signaling operations of steps (d), (e), and (g) are combined into a single step.

Also in accordance with embodiments of the present invention, an identification apparatus within an object to be identified may include: first means for communication with an interrogating device over a communication medium; second means for storing an identification number unique to said object; third means for counting the current digit being interrogated by the interrogation device; fourth means for responding to interrogations with predetermined responses which represent the value of the current digit being interrogated; fifth means for accumulating "push" values; sixth means for detecting signals from the interrogation device to increment the push accumulator; seventh means for adding a value to the push counter in response to said increment signals wherein if the push counter value is 0, then (N−1) minus the value of the current digit is added, and if the push counter value is non-zero, then (N−1) is added; eighth means for detecting signals from the interrogation device to decrement the push counter; ninth means for subtracting a value from the push counter in response to said decrement signals; tenth means for inhibiting response to interrogation when said push accumulator contains a non-zero value; eleventh means for detecting a reset signal from the interrogation device; and twelfth means for resetting said bit counter and push counter values to zero in response to said reset signal.

Also in accordance with embodiments of the present invention, an interrogation apparatus for interrogating objects to be identified may include: first means for sending signals to and receiving signals from said objects over a communication medium; second means for recording and later retrieving incomplete identification numbers whenever two or more predetermined responses are received from objects; third means for sending a signal to the objects to cause said objects to add a number to their push accumulators, said number to be determined by each individual object and dependent upon said individual object's previous responses to the interrogation; fourth means for sending a signal to the objects to cause said objects to subtract a number from their push accumulators, said number to be determined by each individual object and dependent upon said individual object's previous responses to the interrogation; fifth means for recording complete identification numbers as they are determined; and sixth means for sending a signal to interrogate a single digit from the objects to be identified.

Although the invention has been described in conjunction with specific preferred and other embodiments, it is evident that many substitutions, alternatives and variations will be apparent to those skilled in the art in light of the foregoing description. Accordingly, the invention is intended to embrace all of the alternatives and variations that fall within the spirit and scope of the appended claims. For example, it should be understood that, in accordance with the various alternative embodiments described herein, various systems, and uses and methods based on such systems, may be obtained. The various refinements and alternative and additional features also described may be combined to provide additional advantageous combinations and the like in accordance with the present invention. Also as will be understood by those skilled in the art based on the foregoing description, various aspects of the preferred embodiments may be used in various subcombinations to achieve at least certain of the benefits and attributes described herein, and such subcombinations also are within the scope of the present invention. All such refinements, enhancements and further uses of the present invention are within the scope of the present invention.

What is claimed is:

1. A method for interrogating objects to be identified over a communication medium, wherein the objects provide predetermined responses indicative of object identification numbers and each include a push counter, the method comprising the steps of:
    sending interrogation signals to and receiving responses from the objects over the communication medium, the interrogation signals operating to interrogate a single digit from the objects to be identified;
    recording incomplete identification numbers whenever two or more predetermined responses are received from the objects;
    retrieving incomplete identification numbers whenever two or more predetermined responses are received from the objects;
    sending a signal to the objects to cause the objects to selectively add a number to their respective push counter, wherein the number is determined by each object and is dependent upon one or more previous responses of the object to interrogation signals;
    sending a signal to the objects to cause the objects to selectively subtract a number from their respective push counter, wherein the number is determined by each object and is dependent upon one or more previous responses of the object to the interrogation signals; and
    recording complete identification numbers as they are determined.

2. The method of claim 1, wherein the objects are identified based on a depth-first tree traversal algorithm.

3. The method of claim 2, wherein a speed for determining the identification numbers is deterministic given a set of objects to have their identification numbers determined.

4. The method of claim 1, wherein, in response to interrogation of a signal digit from the objects, each object provides a response regardless of the value of the digit being interrogated.

5. The method of claim 1, wherein the communication channel comprises a radio channel.

6. The method of claim 5, wherein the objects each include an RFID transponder.

7. The method of claim 6, wherein the counter is included in control circuitry for the RFID transponder.

8. The method of claim 1, wherein the communication channel comprises a wired communication channel.

9. The method of claim 1, wherein values of the counters selectively inhibit objects from responding to interrogation signals.

10. The method of claim 1, wherein the selective inhibit occurs as part of a depth-first tree traversal algorithm.

11. A method for interrogating objects to be identified over a communication medium, wherein the objects provide predetermined responses indicative of object identification numbers and each includes a push counter, the interrogation comprising the steps of:
    sending signals to and receiving signals from the objects over the communication medium;
    recording and later retrieving incomplete identification numbers whenever two or more predetermined responses are received from the objects;
    sending a signal to the objects to cause the objects to selectively add a number to their respective push counter, the number to be determined by each individual object and dependent upon one or more previous responses of the individual object to the interrogation;
    sending a signal to the objects to cause the objects to selectively subtract a number from their respective push counter, the number to be determined by each individual object and dependent upon one or more previous responses of the individual object to the interrogation;
    recording complete identification numbers as they are determined; and
    sending a signal to interrogate a single digit from the objects to be identified.

12. The method of claim 11, wherein the objects are identified based on a depth-first tree traversal algorithm.

13. The method of claim 12, wherein a speed for determining the identification numbers is deterministic given a set of objects to have their identification numbers determined.

14. The method of claim 11, wherein, in response to interrogation of a signal digit from the objects, each object provides a response regardless of the value of the digit being interrogated.

15. The method of claim 11, wherein the communication channel comprises a radio channel.

16. The method of claim 15, wherein the objects each include an RFID transponder.

17. The method of claim 16, wherein the counter is included in control circuitry for the RFID transponder.

18. The method of claim 11, wherein the communication channel comprises a wired communication channel.

19. The method of claim 11, wherein values of the respective counters selectively inhibit objects from responding to interrogation signals.

20. The method of claim 11, wherein the selective inhibit occurs as part of a depth-first tree traversal algorithm.

* * * * *